United States Patent
Cook

Patent No.: US 6,305,705 B1
Date of Patent: Oct. 23, 2001

(54) NO-SWAY HITCH

(76) Inventor: Estle A. Cook, Rte. 1, Box 196, Butler, MO (US) 64730

(*) Notice: Subject to any disclaimer, the term of this patent is extended or adjusted under 35 U.S.C. 154(b) by 0 days.

(21) Appl. No.: 09/650,844

(22) Filed: Aug. 28, 2000

Related U.S. Application Data

(63) Continuation-in-part of application No. 09/123,474, filed on Jul. 25, 1998, now abandoned.

(51) Int. Cl.$^7$ .................................................. B60D 1/30
(52) U.S. Cl. .................. 280/455.1; 280/458; 280/499
(58) Field of Search ....................... 280/455.1, 456.1, 280/457, 458, 459, 495, 498, 499, 501, 505, 511, 460.1, 461.1, 497

(56) References Cited

U.S. PATENT DOCUMENTS

| | | | |
|---|---|---|---|
| 1,438,831 | * 12/1922 | Jones . | |
| 2,232,407 | * 2/1941 | Riesterer . | |
| 2,412,672 | * 12/1946 | Calhoun . | |
| 2,603,502 | 7/1952 | Hilblom | 280/458 |
| 2,768,837 | 10/1956 | Prater | 280/499 |
| 2,792,238 | * 5/1957 | Schaa | 280/458 |
| 3,487,448 | * 12/1969 | Stemmerman . | |
| 4,398,617 | * 8/1983 | Crabb et al. | 280/467 |
| 5,725,231 | * 3/1998 | Buie | 280/474 |
| 5,775,714 | 7/1998 | Meadows | 280/458 |

FOREIGN PATENT DOCUMENTS

| 200862 | * 8/1956 | (AU) | 280/458 |
|---|---|---|---|
| 562548 | * 9/1958 | (CA) | 280/458 |
| 1160953 | * 6/1985 | (SU) | 280/458 |

* cited by examiner

*Primary Examiner*—Anne Marie Boehler
(74) *Attorney, Agent, or Firm*—Hovey, Williams, Timmons Collins

(57) ABSTRACT

An improved trailer hitch is provided which provides greater control over the towing vehicle and towed vehicle by eliminating swaying of a towed vehicle and permitting the towing vehicle-towed vehicle combination to make sharper turns. The hitch comprises a beam mounted to the parallel side frame members of a towing vehicle. Pivotally attached to the beam are a pair of crossover arms which are also pivotally attached at their opposite ends to a trailer receiver. The receiver includes a traditional trailer attachment for connection to a towed vehicle. The receiver further includes an oscillator mounted on the receiver. This oscillator is operable for moving laterally along a long metal tube which is attached at each end to the frame members of the towing vehicle. The pivotal attachment at each end of the cross-over bars coupled with the lateral movement of the oscillator along the curved tube transfer forces which would normally produce sway in a towed vehicle to the beam mounted near the rear axle of the towing vehicle and to the frame members to which it is attached.

18 Claims, 6 Drawing Sheets

NO-SWAY HITCH

RELATED APPLICATIONS

This applications a continuation-in-part of application Ser. No. 09/123,474, filed on Jul. 25, 1998, now abandoned the content of which is incorporated by reference herein.

BACKGROUND OF THE INVENTION

1. Field of the Invention

The present invention is concerned with devices which attach to a towing vehicle and provide a link between the towing vehicle and a towed vehicle. More particularly, the present invention is concerned with hitches adapted for attachment to a towing vehicle which reduce or eliminate towing vehicle sway caused by road conditions, weather conditions, passing vehicles and towing and/or turning forces. Most particularly, the present invention is concerned with hitches used for trailer towing which increase safety by eliminating sway between the towing vehicle and the towed vehicle while permitting shorter radius turns.

2. Description of the Prior Art

Traditional towing apparatuses typically consist of a ball and socket device wherein a device which includes the ball portion of the towing apparatus is attached to a towing vehicle and a device which includes the socket portion of the towing apparatus is attached to a towed vehicle. The ball portion of this type of assembly is generally attached on or near the bumper of the towing vehicle, thereby placing the point of control approximately four or five feet behind the back wheels of the towing vehicle. This arrangement produces leverage between the towing vehicle and the towed vehicle which lowers the amount of force necessary to produce a swaying movement of the towed vehicle. Such forces can arise from road conditions, weather conditions, passing vehicles, and curves or turns in the road. Any amount of swaying by the towed vehicle adversely effects control of the towing vehicle, thereby producing unsafe driving conditions.

Other towing apparatuses have been designed to shorten the turning radius of the towing vehicle-towed vehicle combination. Generally, this is accomplished by lengthening the distance between the rear axle of the towing vehicle and the connection to the towed vehicle, typically the ball and socket device. This arrangement, while permitting sharper turns due to the angles achievable between the towing vehicle and the towed vehicle, increases the leverage between the two vehicles and reduces the force necessary to cause the towed vehicle to sway.

Accordingly, what is needed in the art is an apparatus which transfers leverage forces between the towing vehicle and the towed vehicle to a point closer to the rear axle of the towing vehicle. Such an apparatus will provide greater control of the towing vehicle and greater stability for the towed vehicle, thereby resulting in an increased level of safety.

SUMMARY OF THE INVENTION

The present invention overcomes the problems inherent in the prior art and provides a distinct advance in the state of the art. The hitch of the present invention reduces or eliminates swaying characteristics of vehicles being towed. Such swaying characteristics can be caused by a number of sources including road conditions, weather conditions, passing vehicles, and road topography. Accordingly, the present invention increases the control operators have over towing vehicles as well as the vehicles which are towed. This will result in increased safety to the passengers of towing vehicles as well as other vehicle operators which share the road.

Generally, the present invention includes a frame which can be connected to a towing vehicle behind the rear axle thereof. Positioning the frame behind the rear axle of the towing vehicle reduces the amount of leverage acting upon the towing vehicle as well as the towed vehicle by reducing the length of the lever. Additionally, such leverage forces are more easily controlled as the side frame members of the towing vehicle are more resistant to such forces. The frame includes a central beam which is positioned between the two parallel frame members of the towing vehicle. It is attached to these members via a cooperative plate and bolt arrangement. In preferred forms, an attachment assembly is secured to the frame members of the towing vehicle and the beam is placed in this attachment assembly. One preferred embodiment comprises a 2"×2" square or rectangular beam inserted between a top plate and a bottom plate of the attachment assembly, thereby securing the beam vertically. To secure the beam laterally, a plurality of bolts extending between the top plate and bottom plate of the connection assembly are tightened, thereby compressing the plates against the beam and securing the beam laterally. Of course, this beam could be mounted in other conventional ways including welding the beam directly the frame members of the towing vehicle.

The beam further includes another attachment assembly, preferably a ball-mount assembly which is used to secure a pair of arms to the beam. The arms are preferably spaced along the beam such that there is a space between each arm and its corresponding vehicle frame member as well as a space between each of the arms themselves. Each of these ball-mount assemblies preferably includes a pair of attachment plates, one of which is secured to the top of the beam and the other of which is secured to the bottom of the beam. These plates can be secured in any conventional fashion to the beam and they extend outwardly from the beam in a transverse fashion. The extended portion of each plate is used to attach to the arms which are pivotally mounted between the top plate and bottom plate. Preferably, the arms are formed by a 1×1 inch square metal tube and the pivoting is about a bolt which extends through the top plate and arm and into the bottom plate. Pivoting is permitted via bushings or bearings.

The arms are connected at their opposite ends to a trailer hitch receiver operable for selective attachment and detachment to a variety of trailers. Moreover, the arms are constructed such that they cross over each other. Accordingly, the arms are constructed with a bowed portion or can be curved throughout such that as the hitch pivots, the arms are permitted to move relative to each other without contact. The arms are pivotally connected to the receiver, again by the use of bearings or bushings. This means that the arms pivot at each end and rotate about the bolts securing them to their respective apparatuses. Preferred methods of attaching the arms to the receiver include a pair of welded flat plates, one on each side of the cross-over bar which are mounted to the cross-over bar at one end and to each other and around the pivot point at the receiver. Of course, there are many conventional ways to pivotally attach the arms to the receiver, and any of these methods will work provided they allow pivotal movement at each end of the cross-over arm.

The receiver includes a traditional hitch tube adapted for receiving the male portion of a trailer and connecting the towing vehicle to the towed vehicle. This tube is generally a 2"×2" tube receiver which is welded between a pair of flat plates. It is these flat plates which are pivotally connected to the arms or cross-over bars. The receiver further includes a bolt hole into which a bolt can be positioned which connects the receiver to the back bumper of a towing vehicle. When the bolt is received in the bolt hole, the receiver is secured in place on the towing vehicle such that it does not permit the oscillator to move laterally along the curved tube. This would keep the hitch from oscillating during times when a trailer or towed vehicle is not attached. Preferably, the receiver is mounted below the back bumper of the towing vehicle and the hitch tube is mounted flush with the rear most portion of the bumper. This positioning helps to eliminate accidental contact of the receiver by other objects and people.

Attached to the top of the receiver is an oscillator, preferably a trolley apparatus contained in a housing. The oscillator can be attached to the receiver in a variety of ways, and is most preferably attached via a bolt extending through the bottom of the oscillator housing into the top plate of the receiver. This bolt may also extend into the hitch tube located on the receiver. Extending through the trolley is a long curved tube which extends between the frame members of the towing vehicle. Preferably, one end of the curved tube is securely attached either directly to the frame member or to an attachment device which is secured to the frame member. The other end of the curved tube is adjustable in that it is not directly attached to the frame member, nor is it directly attached to any attachment device. One preferred form of the present invention includes a first end of the curved tube extending through an attachment plate which is attached to one parallel frame member of a towing vehicle. To secure the curved tube to the attachment plate, a welded seam is provided about the curved tube at the tube-attachment plate junction. The second end of the curved tube extends through a similar attachment plate but is not welded to this plate. Rather, it is held in place by frictional forces which arise from the curved confirmation of the tube. This provides a degree of adjustability for vehicles of different widths.

The oscillator is generally composed of a housing which contains a plurality of rollers, each of which is secured by a pin or bolt. These rollers are rotatable about their pin or bolt and have a groove at a certain radius from the pin or bolt. These grooves operate to allow the rollers to track along the curved tube which is located within these grooves, thereby permitting the entire oscillator to slide or move laterally along the curved tube. The oscillator is also attached to the receiver so that the receiver also moves laterally between the frame members of the towing vehicle. This movement causes the arms to pivot at each of their respective ends which transfers the forces acting upon the towed vehicle to the beam and the frame members to which it is attached. This transfer of forces reduces the leverage which generally causes towed vehicles to sway, thereby preventing such swaying and the attendant safety problems swaying causes to the towing vehicle.

Thus, the hitch of the present invention controls swaying caused by a variety of conditions. This sway is controlled by mounting a beam behind the back axle of a towing vehicle and attaching a pivoting apparatus to this beam such that leverage forces which would normally cause the towed vehicle to sway are transferred to this beam and the frame members of the towing vehicles to which it is attached. Preferably, the pivoting apparatus includes a pair of cross-over bars which are pivotally attached to the beam at one end and to a traditional hitch receiver at the opposite end. This pivoting at each end of the cross-over bars allows the receiver to move laterally relative to the frame members of the towing vehicle. To control this tracking, an oscillator is attached to the top of the receiver. This oscillator has a long curved tube extending through the oscillator and between the frame members of the towing vehicle and the oscillator is designed to move laterally along this curved tube. The long curved tube is attached at each end to the frame members of the towing vehicle via attachment plates. This provides greater control of the towed vehicle by the towing vehicle and also permits the combined towing vehicle/towed vehicle to make sharper turns.

DETAILED DESCRIPTION OF THE PREFERRED EMBODIMENT

The following description sets forth preferred embodiments of the present invention. It is to be understood, however, that this description is provided for illustration only and nothing therein should be taken as a limitation upon the overall scope of the invention.

Figure 1:
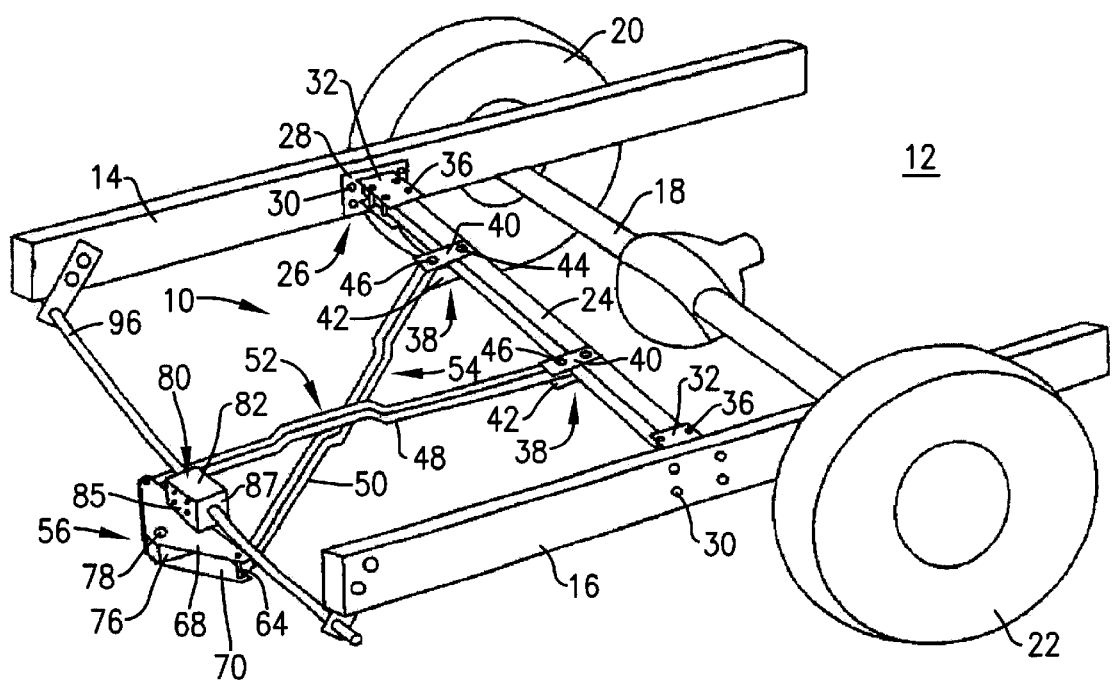
FIG. 1 is a perspective view of the hitch of the present invention attached to frame members of a towing vehicle.
Figure 2:
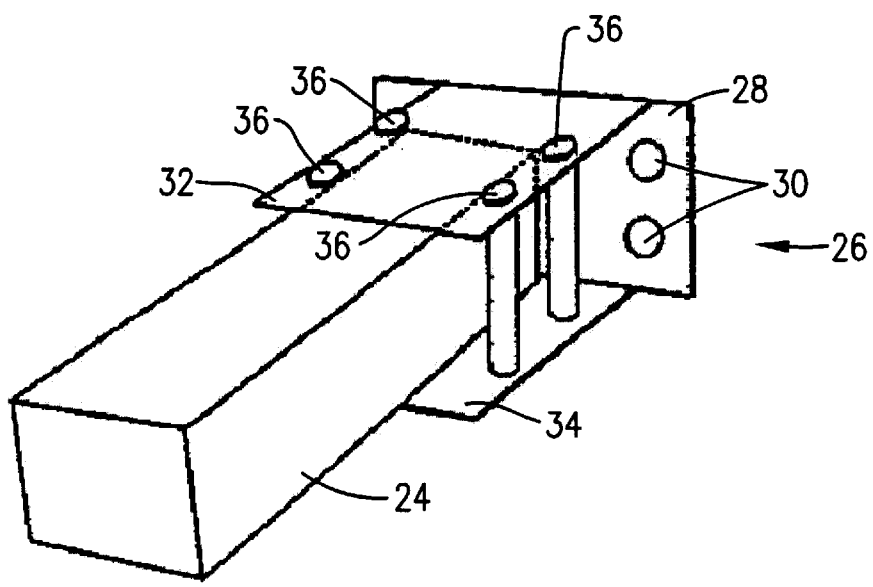
FIG. 2 is a perspective view of a preferred attachment assembly in accordance with the present invention.

The present invention includes hitch 10 operatively attached to a towing vehicle 12 at the side frame members 14, 16. Hitch 10 is preferably composed of strong materials such as metal, and most preferably composed of steel. Preferably, this attachment is behind the rear axle 18 and rear wheels 20 and 22 of a towing vehicle, as shown in FIG. 1. Hitch 10 includes frame beam 24 having opposed ends, each of which is connected to a corresponding side frame member 14, 16 of the towing vehicle via frame beam connector assembly 26. Beam 24 can be of any conventional shape but is preferably rectangular or square in order to facilitate connection to a towing vehicle. Frame beam connector assembly 26, shown in FIG. 2, includes connector assembly side plate 28 positioned against and secured to side frame 14 with at least one fastener 30. Preferably, fastener 30 is inserted into a pre-existing hole in the respective frame member 14, 16. Frame beam connector assembly 26 further includes top and bottom flat plates 32, 34 secured to side plate 28. Plates 32, 34 include a plurality of flat plate bolts 36 which connect top plate 32 with bottom plate 34 and are used to adjust the width therebetween. Frame bar 24 is received within the space between flat plate 32 and flat plate 34 and between the plurality of flat plate bolts 36. Thus, when bolts 36 are tightened, plates 32 and 34 put pressure upon frame beam 24 when it is received therebetween, thereby securely maintaining frame beam 24 in assembly 26. Preferably, frame beam 24 is shorter than the distance between side frame members 14, 16 in order to provide transferability of hitch 10 between vehicles having different frame sizes as well as to provide adjustability for different frame sizes of towing vehicles. When transferring hitch 10 between vehicles of different frame widths, bolts 36 are loosened such that frame beam 24 can be removed from each connector assembly 26. Connector assembly 26 is then removed from frame members 14, 16 and attached to corresponding frame members on another vehicle. Once connector assembly 26 is attached to each frame member 14, 16, connection of hitch 10 to a vehicle is identical to that of transferring hitch 10 between different vehicles. Frame beam 24 is placed into connector assembly 26 between plates 32 and 34 which secure frame beam 24 within assembly 26 on the top and bottom. Bolts 36 are then tightened, thereby securing frame beam 24 laterally and fixedly securing frame beam 24 in assembly 26. Due to the adjustability provided by the length of the frame beam 24 in relation to connector assembly 26, hitch 10 can be removed from one vehicle and attached to another vehicle, even if the vehicles have different distances between frame members 14, 16.

Figure 3:
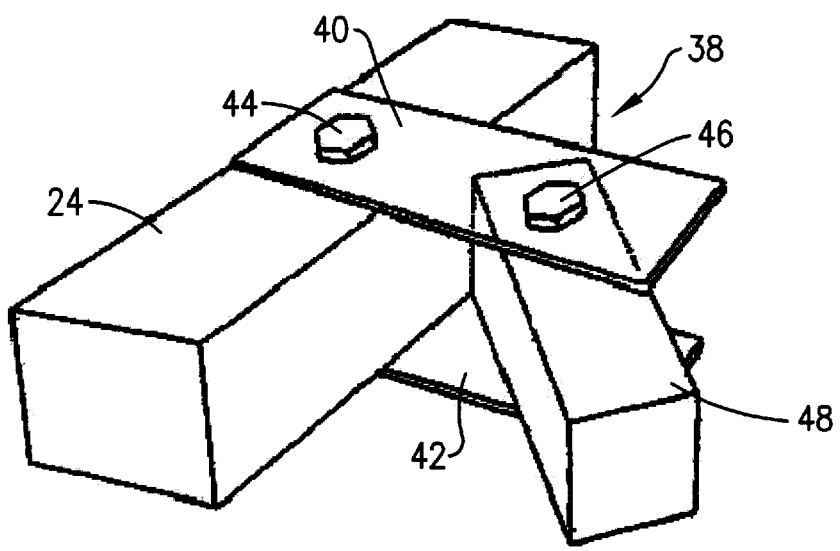
FIG. 3 is a perspective view of a preferred cross-over bar assembly in accordance with the present invention.

Frame beam 24 further includes a pair of ball mount assemblies 38, best seen in FIG. 3, each of which include top plate 40, bottom plate 42 and a frame beam bolt 44 connecting plates 40, 42 to frame beam 24. Bolt 44 extends through plates 40, 42 and through frame beam 24, thereby securing frame beam 24 between plates 40, 42. Each crossover bar assembly 38 further includes bolt 46 extending through plates 40,42 and a cross-over bar 48, 50 thereby securing cross-over bars therebetween. Cross-over bar 48 is pivotable about bolt 46, preferably through the use of brass bushings. One cross-over bar 48, 50, is attached to each of cross-over bar assemblies 38. Cross-over bars 48, 50 crisscross each other such that cross-over bar 48 includes an upwardly bowed portion 52 and cross-over bar 50 includes a corresponding downwardly bowed portion 54. Each of the bowed portions 52, 54 are positioned such that, as cross-over bars 48, 50 pivot about bolt 36 within cross-over bar assemblies 38, bars 48, 50 do not come into contact. Alternatively, cross-over bars 48, 50 could be cooperatively shaped throughout their length in order to prevent contact with each other. The preferred shape of cross-over bars 48, 50 is in the nature of a square or rectangular metal tube.

Figure 4:
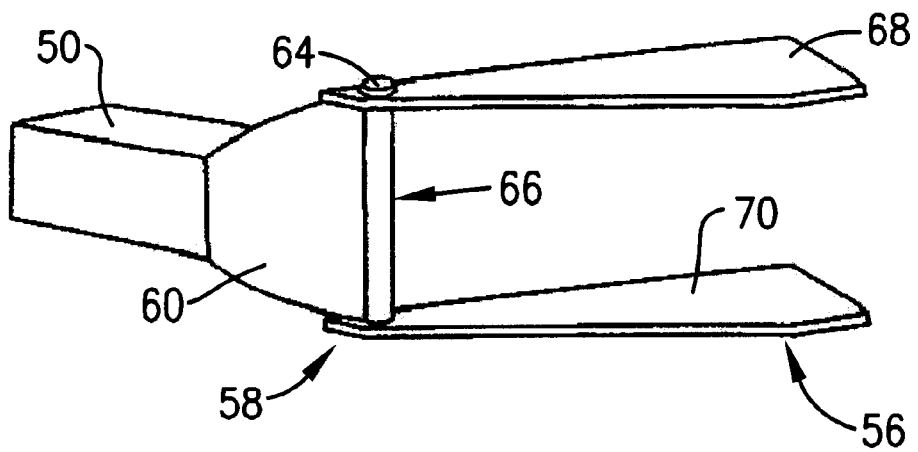
FIG. 4 is a perspective view of a preferred receiver linkage to the cross-over bars of the present invention.

Cross-over bars 48, 50 terminate in receiver 56 via receiver attachment assembly 58, shown in FIG. 4. Receiver attachment assembly 58 includes outer flange 60 welded to cross-over bar 50 and inner flange (not shown). Outer flange 60 and inner flange merge at their ends opposite cross-over bar 48, 50 where they connect to receiver 56. Bolt 64 mounts receiver attachment assembly 58 to receiver 56 at the outer flange-inner flange junction 66. Receiver 56 shown best in FIG. 5 includes receiver top 68, receiver bottom 70, and hitch tube 72 which comprises tube sides 74, 76 laterally and receiver top 68 and receiver bottom 70 vertically, thereby forming a tube within which the hitch of a towed vehicle may be received. Receiver 56 further includes a hitch bolt 78 which can be inserted through bumper 1 12 (shown in phantom in FIG. 5) of a towing vehicle to secure receiver 56 to bumper 112 and prevent pivoting of the hitch 10. In order to permit pivoting by the receiver 56, thereby producing the anti-sway characteristic of the hitch 10, bolt 78 is removed. Preferably, bolt 78 is inserted into a pre-existing hole in the bumper 112.

Receiver 56 is preferably mounted flush with bumper 112 in order to prevent unintended contact of the receiver with objects and people. Of course, receiver 56 can be positioned anywhere along the rear end of a towing vehicle provided it is still positioned to attach to a towed vehicle.

Figure 6:
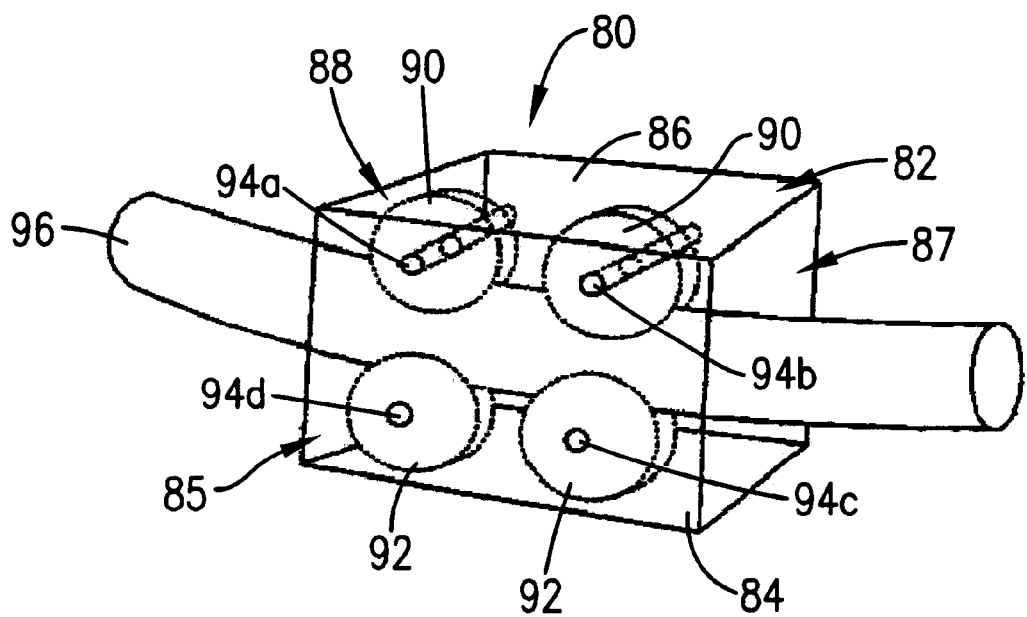
FIG. 6 is a perspective view of a preferred trolley assembly in accordance with the present invention.
Figure 5:
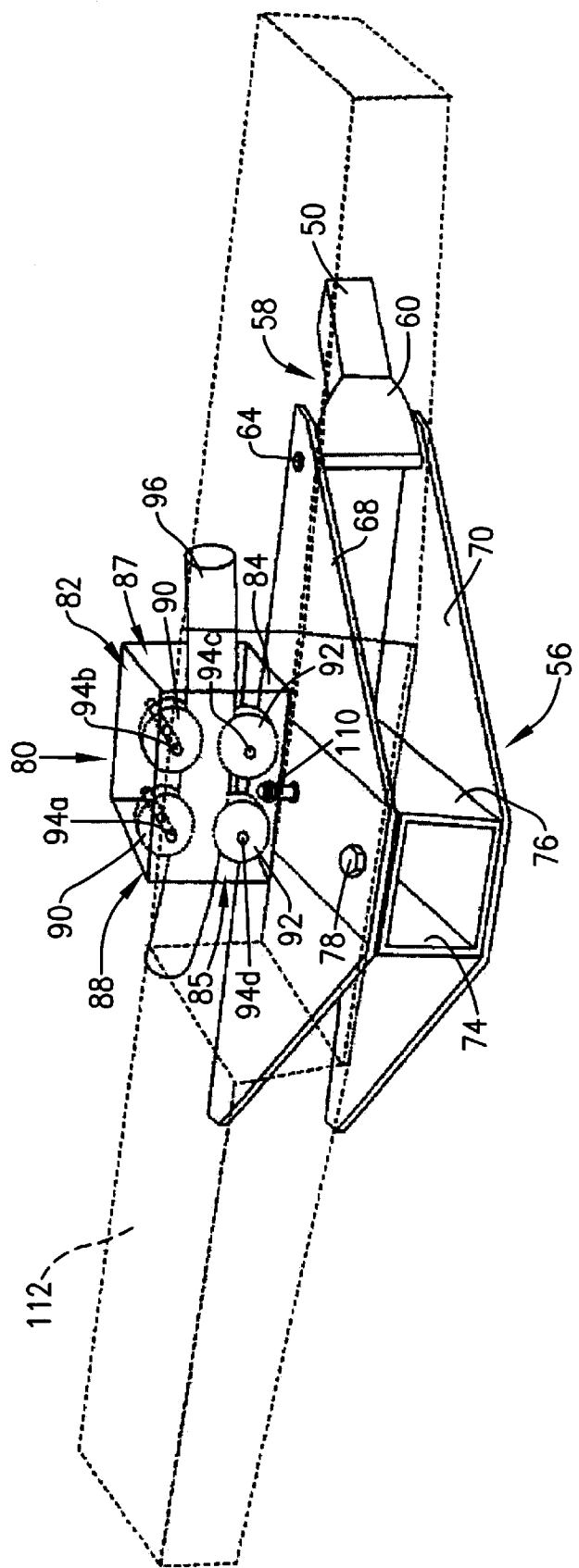
FIG. 5 is a perspective view of a preferred receiver and trolley mounted flush to the bumper of a towing vehicle.
Figure 7:
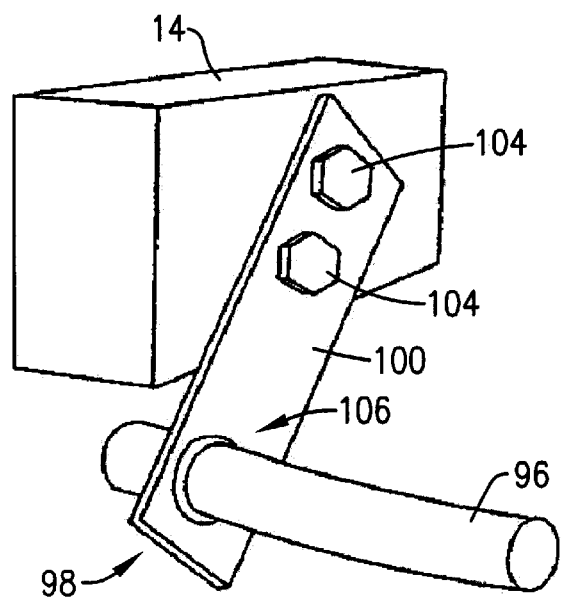
FIG. 7 is a perspective view of a preferred curved bar attachment assembly in accordance with the present invention.
Figure 8:
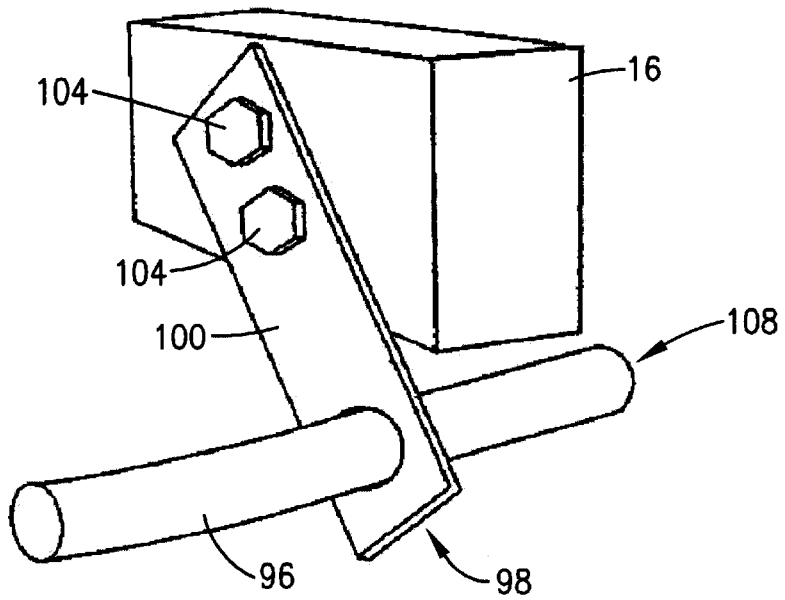
FIG. 8 is a perspective view of another preferred curved bar attachment assembly in accordance with the present invention.
Figure 9:
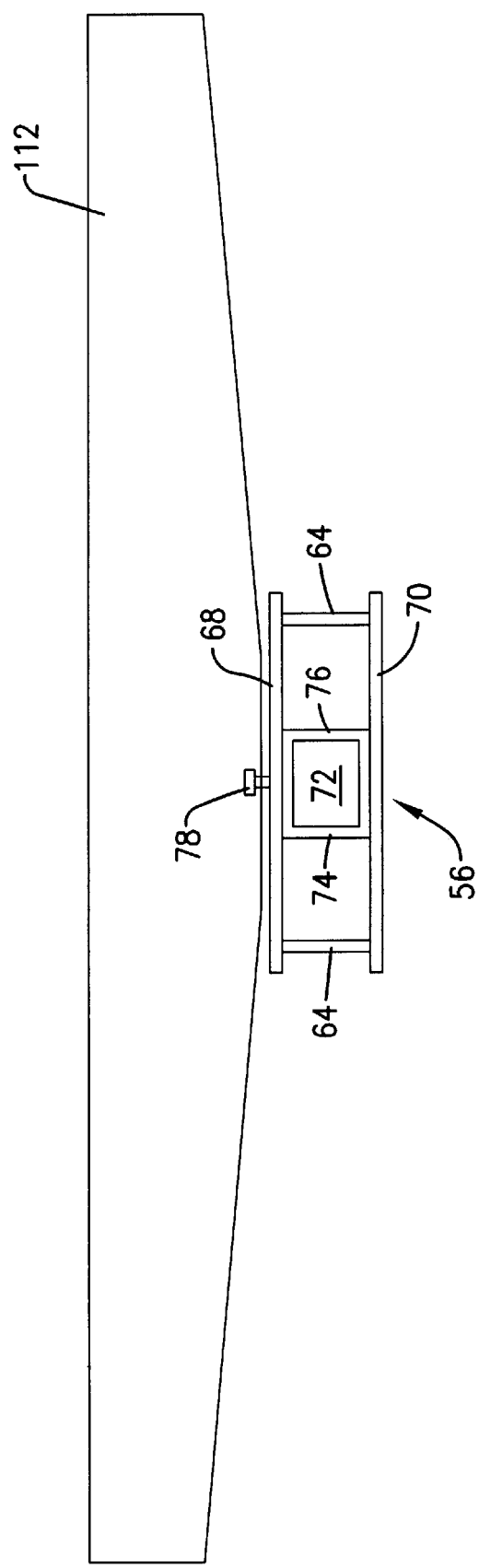
FIG. 9 is a rear view of a preferred receiver mounted to the rear bumper of a towing vehicle.

Trolley housing 80, shown best in FIGS. 5 and 6, is positioned on receiver 56 on top of receiver top 68. Thus, trolley housing 80 is generally located behind bumper 112. Trolley housing 80 presents trolley top 82, trolley bottom 84, trolley front 85, trolley back 86 and two trolley sides 87, 88. Thus, trolley housing 80 is in the general shape of a box. Trolley housing 80 encloses at least one set of tracking rollers including top tracking rollers 90 and bottom tracking rollers 92 all positioned within the trolley housing 80 by roller pins 94a–d. Roller pins 94a–d permit rotational movement of tracking rollers 90, 92 and position these rollers 90, 92 within housing 80 such that curved tube 96 is secured between each set of top tracking rollers 90 and bottom tracking rollers 92. Curved tube 96 is positioned between the rollers 90, 92 and is permitted to roll laterally thereby permitting hitch 10 to oscillate. Housing 80 attaches to receiver top 68 via trolley bolt 110.

Curved tube 96 presents secured end 106 and opposing adjustable end 108. Preferably, secured end 106 extends through curved tube attachment assembly 98 and is affixed to attachment assembly 98 by welding or the like. Curved tube attachment assembly 98 connects curved tube 96 to frame members 14, 16 and includes plate 100 having at least one assembly bolt 104 extending therethrough, thereby securing it to frame member 14 or frame member 16. As with frame beam connector assembly 26, bolt 104 is preferably inserted into a pre-existing hole in the respective frame member 14, 16. Secured end 106 is welded to plate 100 in order to prevent relative movement therebetween. Adjustable end 108 extends through plate 100 and is held in place by the friction between tube 96 and plate 100.

In use, hitch 10 is attached to side frame members 14, 16 of a towing vehicle and receiver 56 receives the male portion of a towed vehicle's hitch assembly in hitch tube 72. When anti-sway characteristics are desired, bolt 78 is either removed from bumper 112 or is not included. When making turns, trolley housing 80 slides along curved tube 96 in the direction of the turn. As the turn is completed and the towing vehicle begins to track along a straight line, housing 80 slides back to a more central position along curved tube 96. Tracking rollers 90, 92 permit this sliding effect along curved tube 96 as tube 96 is positioned between rollers 90, 92. When anti-sway characteristics are not desired, bolt 78 is placed through receiver 56 and into bumper 112, thereby preventing trolley housing 80 from sliding along curved tube 96. When bolt 78 is connected to receiver 56 and bumper 112, hitch 10 exhibits characteristics similar to currently available hitches.

I claim:

1. In a trailer hitch for connecting a trailer to a towing vehicle, wherein the towing vehicle includes substantially parallel frame members and an axle substantially perpendicular to the parallel frame members, said hitch comprising:
 a frame beam adapted for parallel orientation to the axle and having opposed ends, said frame beam adapted for attachment to a parallel frame member at each of said opposed ends;
 a pair of cross-over bars, each of said cross-over bars presenting opposed ends, and each of said pair of cross-over bars being operatively attached to said frame beam at one of said opposed ends;

a receiver operatively attached to each of said other opposed cross-over ends, said receiver presenting a top plate and a bottom plate and a tubular receiver therebetween;

a trolley housing removably attached to said receiver top plate, said trolley housing presenting a box-shaped enclosure including a top plate, a bottom plate, a front plate, a back plate, and two side plates;

at least one pair of rotatable tracking rollers positioned in said housing;

a pin securing each of said tracking rollers, said tracking rollers being rotatable about said pin; and a slide bar presenting opposed ends, said slide bar extending through said trolley housing and being positioned between said tracking rollers, and said slide bar being operably attachable to the vehicle parallel frame members at each of said opposed ends thereof.

2. The trailer hitch of claim 1, said cross-over bars oriented transversely to each other.

3. The trailer hitch of claim 1, each of said cross-over bars including a bowed portion.

4. The trailer hitch of claim 1, each of said cross-over bars being pivotally attached to said frame beam.

5. The trailer hitch of claim 1, each of said cross-over bars being pivotally attached to said receiver.

6. The trailer hitch of claim 1, said receiver further comprising a bolt adapted for attachment to the bumper of a vehicle.

7. The trailer hitch of claim 1, said trolley housing including two pairs of tracking rollers.

8. The trailer hitch of claim 1, said tracking rollers presenting a groove portion operable for retaining said slide bar.

9. The trailer hitch of claim 1 further comprising a pair of attachment assemblies, each of said attachment assemblies operable for mounting one of said slide bar ends to one of the frame members of a towing vehicle.

10. A trailer hitch comprising:

a frame, said frame including a beam;

a pair of arms, each of said arms presenting first and second ends and each of said first and second ends being spaced from the other end and each of said first ends being rotatably attached to said beam, and said arms being transversely oriented relative to each other;

a receiver attached to each of said second ends;

an oscillator mounted on said receiver; and a sliding tube extending through said oscillator, said sliding tube presenting opposed ends and being operable for permitting said oscillator to travel laterally along said sliding tube.

11. The trailer hitch of claim 10, further comprising a pair of adjustable attachment assemblies, each of said attachment assemblies operable for mounting one of said sliding tube ends to a frame member on a towing vehicle.

12. A trailer hitch comprising:

a frame, said frame including a beam;

a pair of arms, each of said arms including a bowed portion and presenting first and second ends and each of said first and second ends being spaced from the other end and each of said first ends being rotatably attached to said beam;

a receiver attached to each of said second ends;

an oscillator mounted on said receiver; and a sliding tube extending through said oscillator, said sliding tube presenting opposed ends and being operable for permitting said oscillator to travel laterally along said sliding tube.

13. The trailer hitch of claim 12, further comprising a pair of adjustable attachment assemblies, each of said attachment assemblies operable for mounting one of said sliding tube ends to a frame member on a towing vehicle.

14. A trailer hitch comprising:

a frame, said frame including a beam;

a pair of arms, each of said arms presenting first and second ends and each of said first and second ends being spaced from the other end and each of said first ends being rotatably attached to said beam;

a receiver pivotally attached to each of said second ends;

an oscillator mounted on said receiver, and a sliding tube extending through said oscillator, said sliding tube presenting opposed ends and being operable for permitting said oscillator to travel laterally along said sliding tube.

15. The trailer hitch of claim 14, further comprising a pair of adjustable attachment assemblies, each of said attachment assemblies operable for mounting one of said sliding tube ends to a frame member on a towing vehicle.

16. A trailer hitch comprising:

a frame, said frame including a beam;

a pair of arms, each of said arms presenting first and second ends and each of said first and second ends being spaced from the other end and each of said first ends being rotatably attached to said beam;

a receiver attached to each of said second ends;

an oscillator mounted on said receiver, said oscillator including at least one pair of rotatable tracking rollers; and a sliding tube extending through said oscillator, said sliding tube presenting opposed ends and being operable for permitting said oscillator to travel laterally along said sliding tube, said tracking rollers sandwiching said sliding tube therebetween.

17. The trailer hitch of claim 16, said tracking rollers presenting a groove portion operable for retaining said sliding tube therebetween.

18. The trailer hitch of claim 16, further comprising a pair of adjustable attachment assemblies, each of said attachment assemblies operable for mounting one of said sliding tube ends to a frame member on a towing vehicle.

* * * * *